US011428853B2

United States Patent
Wang et al.

(10) Patent No.: US 11,428,853 B2
(45) Date of Patent: Aug. 30, 2022

(54) TOUCH DEVICE AND MANUFACTURING METHOD THEREOF, INTELLIGENT MIRROR

(71) Applicants: BEIJING BOE DISPLAY TECHNOLOGY CO., LTD., Beijing (CN); BOE TECHNOLOGY GROUP CO., LTD., Beijing (CN)

(72) Inventors: Jing Wang, Beijing (CN); Qi Wang, Beijing (CN); Bo Li, Beijing (CN); Hetao Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 93 days.

(21) Appl. No.: 16/963,518

(22) PCT Filed: Feb. 6, 2020

(86) PCT No.: PCT/CN2020/074378
§ 371 (c)(1),
(2) Date: Jul. 21, 2020

(87) PCT Pub. No.: WO2020/168917
PCT Pub. Date: Aug. 27, 2020

(65) Prior Publication Data
US 2021/0373207 A1    Dec. 2, 2021

(30) Foreign Application Priority Data
Feb. 20, 2019    (CN) .......................... 201910127599.8

(51) Int. Cl.
G06F 3/041    (2006.01)
G02B 5/02    (2006.01)
A47G 1/02    (2006.01)

(52) U.S. Cl.
CPC ............. *G02B 5/0215* (2013.01); *A47G 1/02* (2013.01); *G02B 5/0278* (2013.01); *G06F 3/041* (2013.01); *G06F 2203/04103* (2013.01)

(58) Field of Classification Search
USPC ........ 345/173, 174, 156; 359/599, 601, 609; 427/536
See application file for complete search history.

(56) References Cited

U.S. PATENT DOCUMENTS 10,414,122 B2    9/2019    Wu
2009/0061165 A1*  3/2009    Iwata ...................... G02B 1/11
                                                        428/179

(Continued)

FOREIGN PATENT DOCUMENTS

CN    204883652    12/2015
CN    105260056    1/2016

(Continued)

OTHER PUBLICATIONS

Chinese Patent Office Action dated Dec. 25, 2020 corresponding to Chinese Patent Application No. 201910127599.8; 7 pages.

*Primary Examiner* — Thuy N Pardo
(74) *Attorney, Agent, or Firm* — Leason Ellis LLP (57) ABSTRACT

A touch device, a manufacturing method thereof and an intelligent mirror are disclosed. The touch device includes: a touch functional layer, configured to sense an occurrence of touch; a cover plate located on the touch functional layer; and an anti-dazzle layer, the anti-dazzle layer being disposed between the touch functional layer and the cover plate, and the anti-dazzle layer being configured to scatter light incident on the anti-dazzle layer.

17 Claims, 5 Drawing Sheets

(56) References Cited

U.S. PATENT DOCUMENTS

| | | | | |
|---|---|---|---|---|
| 2009/0268299 A1* | 10/2009 | Furui | ............... | G02B 5/0242 |
| | | | | 359/601 |
| 2010/0062225 A1* | 3/2010 | Takahashi | ............... | C08F 2/48 |
| | | | | 427/536 |
| 2010/0091374 A1* | 4/2010 | Iwata | ............... | G02F 1/133502 |
| | | | | 359/599 |
| 2010/0177397 A1* | 7/2010 | Kamiyama | ............... | H01J 11/44 |
| | | | | 359/609 |
| 2012/0002397 A1* | 1/2012 | Iwata | ............... | G02B 1/111 |
| | | | | 362/97.1 |
| 2014/0002899 A1* | 1/2014 | Kishi | ............... | G02B 5/3008 |
| | | | | 359/483.01 |
| 2015/0301667 A1* | 10/2015 | Yano | ............... | G06F 3/0412 |
| | | | | 345/173 |
| 2016/0209721 A1* | 7/2016 | Matsumoto | ............... | G02F 1/155 |
| 2017/0023705 A1* | 1/2017 | Sahara | ............... | G02B 1/11 |
| 2017/0168366 A1* | 6/2017 | Shinoda | ............... | G02F 1/153 |
| 2018/0143706 A9* | 5/2018 | Wu | ............... | G06F 3/041 |

FOREIGN PATENT DOCUMENTS

| | | |
|---|---|---|
| CN | 105446532 | 3/2016 |
| CN | 105988619 | 10/2016 |
| CN | 205788136 | 12/2016 |
| CN | 106406626 | 2/2017 |
| CN | 106738624 | 5/2017 |
| CN | 207541607 | 6/2018 |
| CN | 209231652 | 8/2019 |
| JP | 2012003900 | 1/2012 |

\* cited by examiner

| Forming a touch functional layer, the touch functional layer being configured to sense an occurrence of touch |
|---|
| Forming a cover plate on the touch functional layer |
| Forming an anti-dazzle layer between the touch functional layer and the cover plate, the anti-dazzle layer being configured to scatter light incident into the anti-dazzle layer |

FIG. 11

TOUCH DEVICE AND MANUFACTURING METHOD THEREOF, INTELLIGENT MIRROR

CROSS-REFERENCE TO RELATED APPLICATION

The present application is a U.S. National Stage Application under 35 U.S.C. § 371 of International Patent Application No. PCT/CN2020/074378, filed Feb. 6, 2020, which claims priority of China Patent application No. 201910127599.8 under the title of "A TOUCH DEVICE AND AN INTELLIGENT MIRROR" filed on Feb. 20, 2019, both of which are incorporated by reference in their entireties.

TECHNICAL FIELD

Embodiments of the present disclosure relate to a touch device, a manufacturing method of the touch device and an intelligent mirror.

BACKGROUND

Rainbow stripe is an optical phenomenon occurring in some liquid crystal display screens after they are lighted on. The rainbow stripe usually occurs symmetrically at both sides of the screen at an angle greater than 45° and presented as a colored annular-shaped stripe similar with a Newton ring, by taking an angle vertical to the screen as 0° and taking an angle parallel to the screen as 90°. The rainbow stripe is an optical phenomenon uniquely occurring for birefringence materials. Refracted light inside the birefringence material may be reflected for multiple times at an upper surface and a lower surface of the material, and an interference phenomenon occurs while the reflected light meets an optical path difference condition, so as to form the rainbow stripe.

SUMMARY

Embodiments of the present disclosure provide a touch device, a manufacturing method thereof and an intelligent mirror.

According to a first aspect of the present disclosure, it is provided a touch device including:

a touch functional layer, configured to sense an occurrence of touch;

a cover plate, located on the touch functional layer; and an anti-dazzle layer, the anti-dazzle layer being disposed between the touch functional layer and the cover plate, and the anti-dazzle layer being configured to scatter light incident on the anti-dazzle layer.

According to a second aspect of the embodiments of the present disclosure, it is provided an intelligent mirror including:

the touch device as described above; and a display module, the display module being disposed at a side of the touch functional layer away from the anti-dazzle layer.

According to a third aspect of the embodiments of the present disclosure, it is provided a manufacturing method of a touch device, the method including:

forming a touch functional layer, the touch functional layer being configured to sense an occurrence of touch;

forming a cover plate on the touch functional layer; and forming an anti-dazzle layer between the touch functional layer and the cover plate, the anti-dazzle layer being configured to scatter light incident on the anti-dazzle layer.

BRIEF DESCRIPTION OF THE DRAWINGS

In order to more clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not intended to define a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

An intelligent mirror is a touch liquid crystal display screen using an increased-reflectivity decreased-transmittance (high light reflectivity and low light transmittance) glass as a cover glass, and the intelligent mirror have both of a mirror surface function and a display function. A base of a touch screen usually adopts polyethylene terephthalate (PET) with birefringence property, which results in an obvious rainbow stripe phenomenon on the touch screen under a strong reflective effect of the cover glass.

When a basis structure of the display screen is fixed, a position and a shape of the rainbow stripe cannot be varied with a movement of a viewing angle of an observer and may be permanently presented on the display screen after it's lighted on. At present, a conventional solution for the rainbow stripe phenomenon in the related field is to adjust a direction of the rainbow stripe presented on the screen so as to satisfy visual demands of customers. However, such solution increases the cost of the product, weakens the market competitiveness of the product, and still cannot completely eliminate the rainbow stripe.

Embodiments of the present disclosure provide a touch device, a manufacturing method of the touch device, and an intelligent mirror including the touch device, so as to reduce or eliminate the rainbow stripe occurring in the touch device.

According to an embodiment of the present disclosure, a touch device is provided. The touch device includes: a touch functional layer configured to sense an occurrence of touch; a cover plate located on the touch functional layer; and an anti-dazzle layer, the anti-dazzle layer is disposed between the touch functional layer and the cover plate, and the anti-dazzle layer is configured to scatter light incident on the anti-dazzle layer.

In the touch device of the above-described embodiment, by providing the anti-dazzle layer between the cover plate and the touch functional layer, the light emitted from the touch functional layer can be scattered, so as to reduce or eliminate the rainbow stripe causes by the touch functional layer and improve the display performance of the touch display device.

Figure 1:
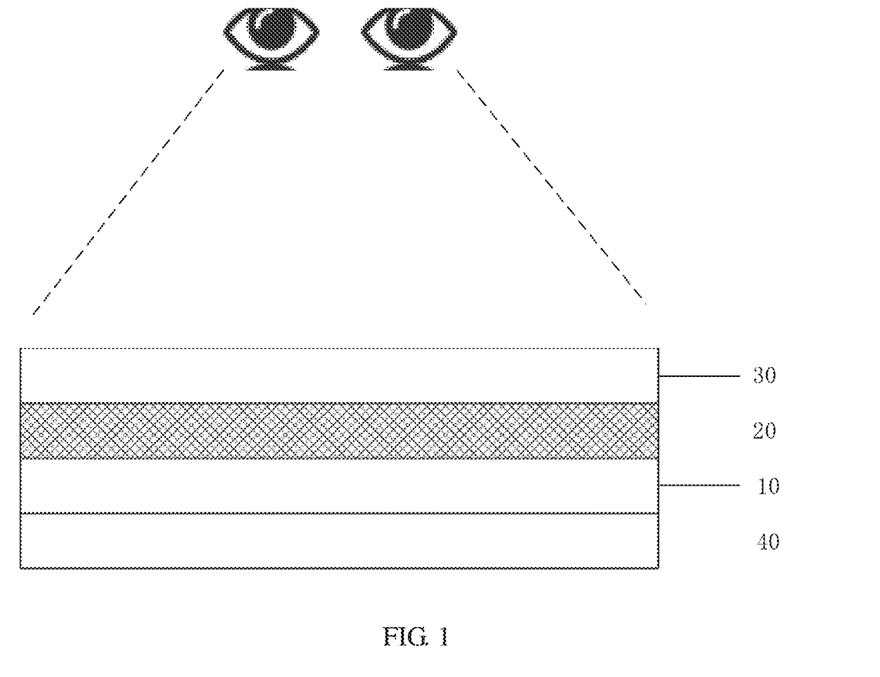
FIG. 1 is a structural diagram of a touch device provided by an embodiment of the present disclosure.

FIG. 1 illustrates a touch device provided by an embodiment of the present disclosure. With reference to FIG. 1, the touch device includes a touch functional layer 10, a cover glass 30 and an anti-dazzle layer 20; the anti-dazzle layer 20 is disposed between the touch functional layer 10 and the cover glass 30; the anti-dazzle layer 20 is configured to scatter light incident on the anti-dazzle layer 20.

In the embodiment of the present disclosure, the cover glass is a high-reflectivity low-transmittance glass. For example, a reflectivity of the cover plate is about 70%, and a light transmittance of the cover plate is about 30%.

In the embodiment of the present disclosure, the cover plate is a high-reflectivity low-transmittance glass, so that the touch device can achieve the display effect and the reflective effect at the same time.

In the embodiment of the present disclosure, the anti-dazzle layer 20 can be made of an anti-dazzle film material, and serves for scattering light passing through the touch functional layer 10.

Figure 2:
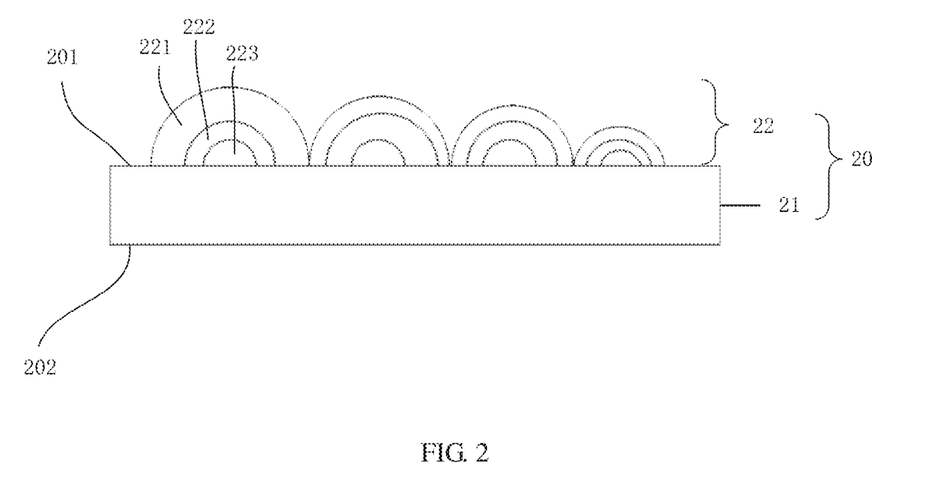
FIG. 2 is a structural diagram of an anti-dazzle layer provided by an embodiment of the present disclosure.

In the embodiment of the present disclosure, referring to FIG. 2, the anti-dazzle layer 20 includes a base layer 21 and a plurality of convex parts 22; the convex part 22 is at least disposed at a side of the base layer facing towards the cover glass 30. The convex part 22 is configured to scatter light incident on the anti-dazzle layer.

In the embodiment of the present disclosure, referring to FIG. 2, the base layer 21 includes a first surface 201 facing towards the cover glass 30 and a second surface 202 facing towards the touch functional layer 10; the convex part 22 is only disposed on the first surface 201 of the base layer 21 close to the cover glass 30, and the second surface 202 is not provided with the convex part 22. In this way, light from the touch functional layer 10 passes through the second surface 202 and the first surface 201, and then is incident onto the convex part 22, the convex part 22 scatters the light so as to reduce or eliminate the rainbow stripe.

For example, a protruded direction of the convex part 22 on the first surface 201 is pointed to the cover glass 30. In the embodiment of the present disclosure, the plurality of convex parts 22 may have different sizes or have a same size. For example, as illustrated in FIG. 2, the plurality of convex parts 22 have non-uniform sizes and are irregularly distributed on the base layer 21. In the situation where the plurality of convex parts 22 have the same size, the difficulty of the manufacturing process can be lowered.

Figure 3:
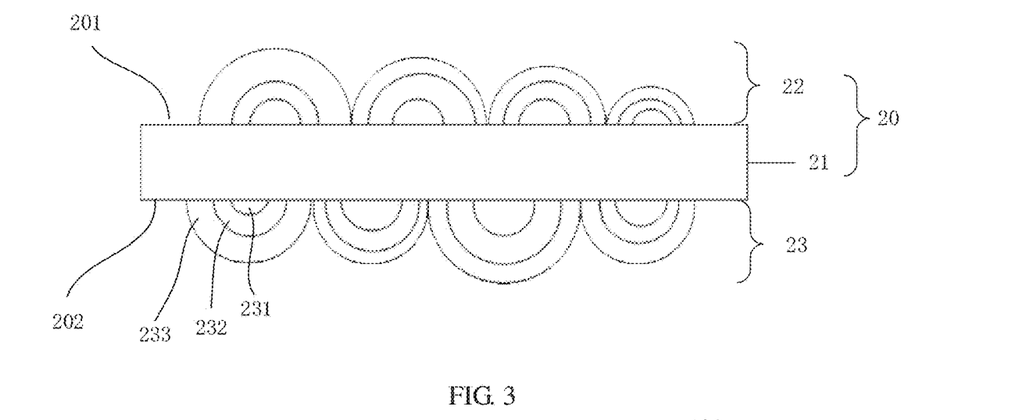
FIG. 3 is a structural diagram of another anti-dazzle layer provided by an embodiment of the present disclosure.

In the embodiment of the present disclosure, referring to FIG. 3, the first surface 201 of the base layer 21 is provided with a plurality of convex parts 22, and the second surface 202 of the base layer 21 is provided with a plurality of convex parts 23. A protruded direction of the convex part 23 is pointed to the touch functional layer 10; the convex part 23 includes a first material layer 231, a second material layer 232 enveloping the first material layer 231, and a third material layer 233 enveloping the second material layer 232. That is, in the embodiment of the present disclosure, the convex part may be arranged on a single surface of the anti-dazzle layer 20, or on both surfaces of the anti-dazzle layer 20. In FIG. 3, light from the touch functional layer 10 is incident onto the convex part 23 firstly, and then scattered thereon; the scattered light then is incident onto the convex part 22 again and scattered again. The convex part 22 and the convex part 23, together, play a role of double scattering, which is more advantageous for reducing or even eliminating the rainbow stripe on the touch device. Further, in at least one example, the size and the distribution of the convex part 23 on the second surface 202 are different from or as same as those of the convex part 22 on the first surface 201. In the situation of adopting convex parts with the same size, the difficulty of the manufacturing process can be lowered.

In the embodiment of the present disclosure, the surface of the anti-dazzle layer 20 close to the cover glass 30 is provided with the convex part, so as to ensure that the light passing through the touch functional layer is propagated in a direction of front viewing angle. Irregular convex parts can ensure the light to be propagated inside the anti-dazzle layer irregularly, so as to ensure the light exiting the touch functional layer to be scattered after passing through the anti-dazzle layer, thereby eliminating the rainbow stripe.

In the embodiment of the present disclosure, when the anti-dazzle layer includes the convex part only provided at the side of the base layer facing towards the cover glass, the anti-dazzle layer is coupled to the cover glass in a frame-bonding manner, and the anti-dazzle layer is coupled to the touch functional layer in a full-surface bonding manner When the anti-dazzle layer includes the convex part provided at both sides of the base layer, the anti-dazzle layer is coupled to the cover glass in a frame-bonding manner, and the anti-dazzle layer is coupled to the touch functional layer in a frame-bonding manner.

In the embodiment of the present disclosure, for the purpose of bonding the anti-dazzle layer with both the cover plate layer and the touch functional layer in a better way, the touch device further includes a first adhesive layer and a second adhesive layer. The first adhesive layer is disposed between the anti-dazzle layer and the cover plate and is configured to adhere the anti-dazzle layer with the cover plate. The second adhesive layer is disposed between the anti-dazzle layer and the touch functional layer and is configured to adhere the anti-dazzle layer with the touch functional layer. For example, referring to FIG. 4, the touch device includes a touch functional layer 110, a cover plate 130, and an anti-dazzle layer 120 disposed between the touch functional layer 110 and the cover plate 130; the anti-dazzle layer 120 is configured to scatter light incident on the anti-dazzle layer 120. The touch device further includes: a first adhesive layer 111 disposed between the anti-dazzle layer 120 and the cover plate 130, and a second adhesive layer 112 disposed between the anti-dazzle layer 120 and the touch functional layer 110.

Figure 4:
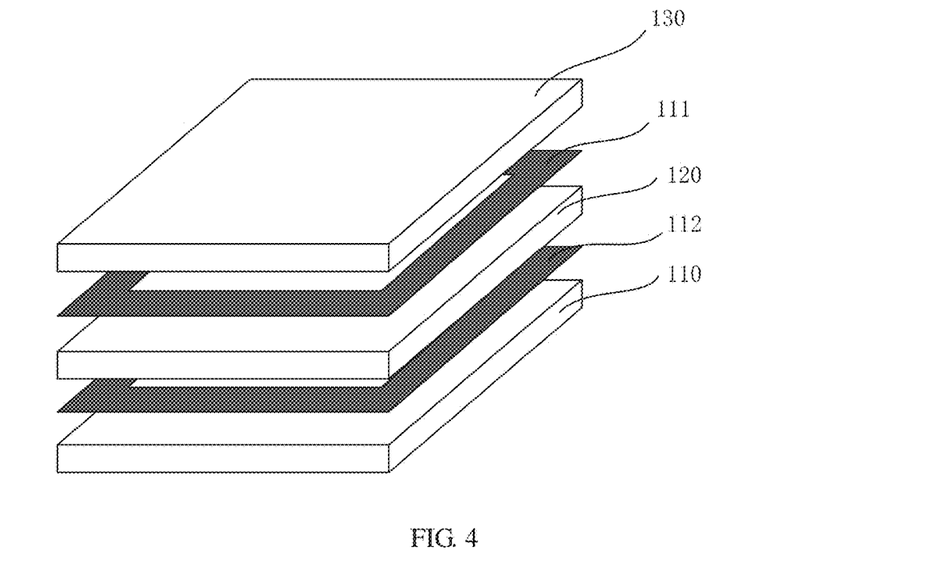
FIG. 4 is a stereoscopic view of a touch device provided by an embodiment of the present disclosure.

In the embodiment of the present disclosure, both the first adhesive layer 111 and the second adhesive layer 112 adopt an optical adhesive. For example, optically clear resin (OCR) or optically clear adhesive (OCA, which is an inorganic adhesive composition).

In the embodiment of the present disclosure, the first adhesive layer 111 or the second adhesive layer 112 may adopt a full-surface bonding manner or a frame-bonding manner. The full-surface bonding manner refers to coating the optical adhesive on the entire surface of the anti-dazzle layer. The frame-bonding manner refers to coating the optical adhesive on a periphery region of the surface of the anti-dazzle layer. For example, on the surface of the base layer that is provided with the convex part, the convex part is located at a central region of the surface, and the optical adhesive is coated on a periphery region of the surface of the anti-dazzle layer surrounding the convex part; in this way, the optical adhesive can barely influence the light incident on the anti-dazzle layer.

Figure 5:
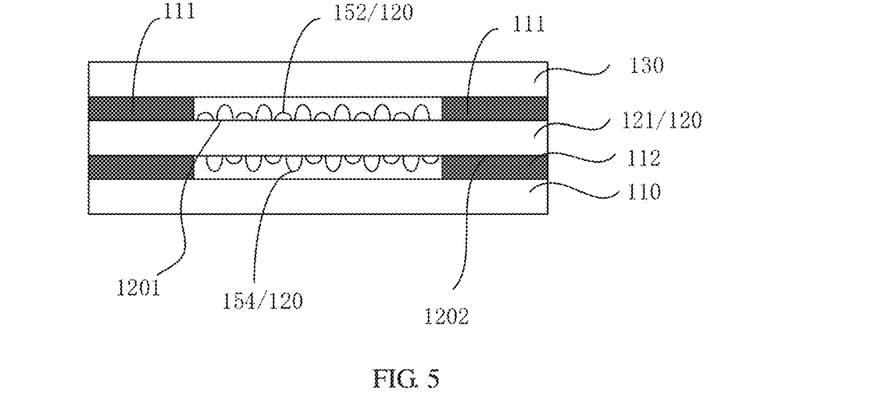
FIG. 5 is a cross-sectional view of a touch device provided by an embodiment of the present disclosure.

In the embodiment of the present disclosure, referring to FIG. 5, the first surface 1201 of the base layer 121 is provided with a plurality of convex parts 152, and the second surface 1202 of the base layer 121 is provided with a plurality of convex parts 154. The first adhesive layer 111 adheres the first surface 1201 of the base layer 121 with the cover plate 130 in a frame-bonding manner, and an orthographic projection of the first adhesive layer 111 on the base layer 121 has no overlap with orthographic projections of the plurality of convex parts 152 on the base layer 121, so that the first adhesive layer 111 can barely influence the light incident onto the convex part 152.

Figure 6:
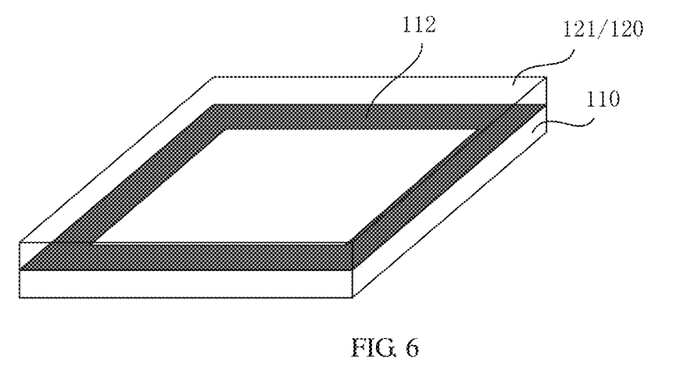
FIG. 6 is a partial stereoscopic view of a touch device provided by an embodiment of the present disclosure.

Similarly, in the embodiment of the present disclosure, the second adhesive layer 112 adheres the second surface 1202 of the base layer 121 with the touch functional layer 110 in a frame-bonding manner, the second adhesive layer 112 is disposed on the second surface 1202 of the base layer 121, and an orthographic projection of the second adhesive layer 112 on the base layer 121 has no overlap with orthographic projections of the plurality of convex parts 154 on the base layer 121, so that the second adhesive layer 112 can barely influence the light incident onto the convex part 154. Further, in at least one example, at least one of the first adhesive layer and the second adhesive layer provided in a frame-bonding manner is disposed at a periphery region of the base layer along a perimeter of the base layer. Referring to FIG. 6, the second adhesive layer 112 is disposed at the periphery region of the base layer 121; and in a plane parallel to the base layer, the second adhesive layer 112 is in a closed-loop shape.

In the embodiment of the present disclosure, the second surface of the base layer may not be provided with the convex part. In such case, the second adhesive layer may adopt a frame-bonding manner or a full-surface bonding manner. In the case of frame-bonding manner, the cost of the material as used can be reduced; in the case of full-surface bonding manner, the degree of adhesion and the performance stability of the product can be increased.

Figure 7:
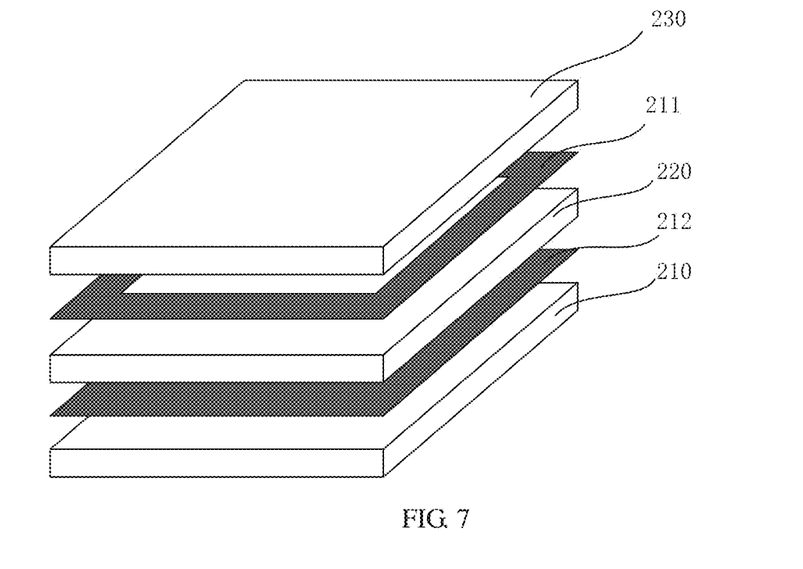
FIG. 7 is a stereoscopic view of another touch device provided by an embodiment of the present disclosure.
Figure 8:
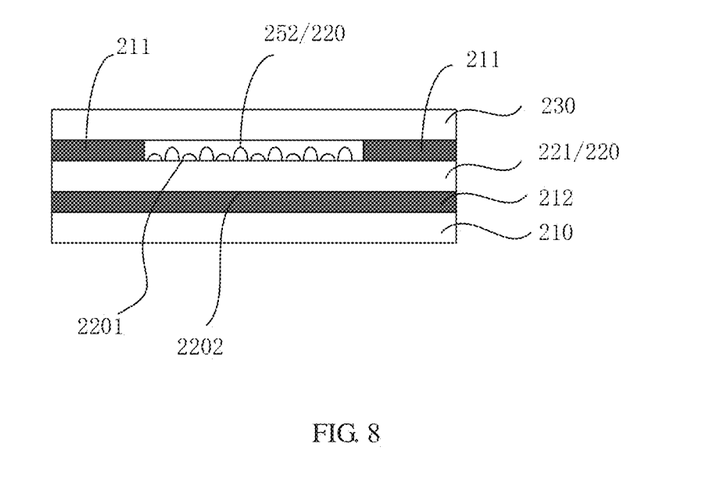
FIG. 8 is a cross-sectional view of another touch device provided by an embodiment of the present disclosure.
Figure 9:
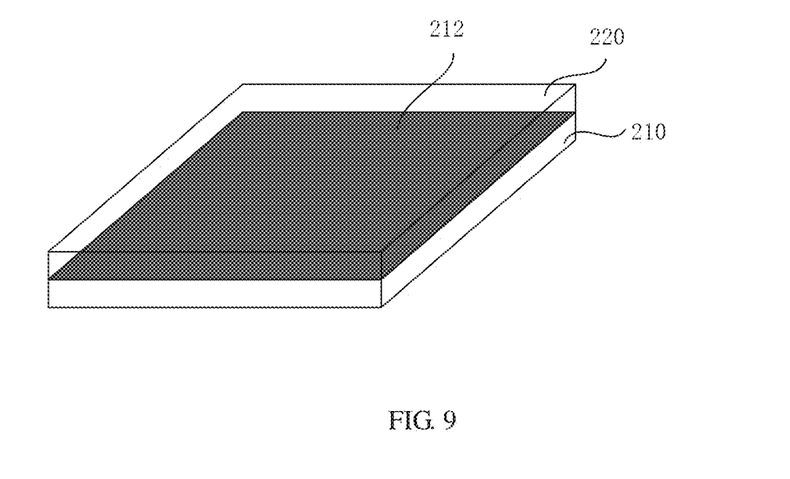
FIG. 9 is a partial stereoscopic view of another touch device provided by an embodiment of the present disclosure.

In the embodiment of the present disclosure, referring to FIGS. 7-9, the touch device includes a touch functional layer 210, a cover plate 230 and an anti-dazzle layer 220 disposed between the touch functional layer 210 and the cover plate 230; the anti-dazzle layer 220 is configured to scatter light incident on the anti-dazzle layer 220. The touch device further includes: a first adhesive layer 211 disposed between the anti-dazzle layer 220 and the cover plate 230, and a second adhesive layer 212 disposed between the anti-dazzle layer 220 and the touch functional layer 210. The touch device of FIG. 7 differs from the touch device of FIG. 4 in that, the base layer 221 of FIG. 7 is provided with the convex parts 252 only on the first surface 2201, and the second surface 2202 of the base layer 221 is not provided with the convex parts; furthermore, the second adhesive layer 212 is formed on the entire second surface 2202 of the base layer 221.

In the embodiment of the present disclosure, a side of the anti-dazzle layer 20 that is provided with the convex part can also be coupled with the cover glass 30 and/or the touch functional layer 10 in a full-surface bonding manner. In such case, the first optical adhesive selected for the full-surface bonding manner facing towards the cover glass 30 has a refractive index between a refractive index of a third material layer 223 of the convex part 22 adjacent to the first optical adhesive and a refractive index of the cover glass 30. The second optical adhesive selected for the full-surface bonding manner facing towards the touch functional layer 10 has a refractive index between a refractive index of a third material layer 233 of the convex part 23 adjacent to the second optical adhesive and a refractive index of a film layer in the touch functional layer 10 adjacent to the convex part 23.

In the embodiment of the present disclosure, the convex part is of a core-shell structure, and a refractive index of a material used by the core-shell structure is gradually increased from the core to the shell.

In the embodiment of the present disclosure, referring to FIG. 2, the convex part 22 includes at least three material layers; a refractive index of the at least three material layers is gradually increased, layer by layer, from the base layer in a direction away from the base layer.

In the embodiment of the present disclosure, the convex part 22 includes a first material layer 221, a second material layer 222 and a third material layer 223 which are disposed in a sequentially enveloping manner; that is, the first material layer 221 is used as the core, the second material layer 222 envelops the first material layer 221, the third material layer 223 envelops the second material layer 222, and the first material layer 221 is closer to the base layer 21 than both the second material layer 222 and the third material layer 223 to the base layer 21.

In the embodiment of the present disclosure, a refractive index of the first material layer 221 is in a range of 1.15-1.45; a refractive index of the second material layer 222 is in a range of 1.25-1.55; a refractive index of the third material layer 223 is in a range of 1.35-1.65.

In the embodiment of the present disclosure, a material of the convex part 22 is at least one selected from the group consisting of silicon oxide, titanium dioxide, cerium fluoride, sodium hexafluoroaluminate (commonly referred to as cryolite), aluminium sesquioxide, hafnium oxide, calcium fluoride, magnesium fluoride, magnesium oxide, zirconium oxide, praseodymium fluoride, scandium oxide, lanthanum fluoride, barium fluoride and yttrium fluoride. Further, in at least one example, the three material layers are made of three different materials, respectively.

In the embodiment of the present disclosure, the refractive index of each of the material layers of the convex part 22 not only depends on a physical property of the material, but also depends on a microstructure of the material, for example, a mesoporous structure.

In the embodiment of the present disclosure, the convex part 22 can be made by adopting a magnetron sputtering method, an atomic layer deposition method or the like. A refractive index of the convex part including multiple material layers is sequentially increased from the first material layer 221 to the third material layer 223, so as to ensure that the light is propagated towards a direction of front viewing angle; the irregular convex part can ensure the light to be irregularly propagated inside the anti-dazzle layer 20, so as to ensure the light exiting the touch functional layer 10 to be scattered after passing through the anti-dazzle layer 20, thereby eliminating the rainbow stripe.

In the embodiment of the present disclosure, the convex part 22 includes an irregular structure having a size in a range of 1 nm-5000 nm.

In the embodiment of the present disclosure, the touch functional layer 10 is a touch sensor which adopts a glass-film-film (GFF) architecture or a glass-film (GF) architecture; the touch functional layer 10 includes a base material layer, and the base material layer includes a material with birefringence effect. For example, the touch functional layer includes a birefringence film layer, and the birefringence film layer has birefringence property. For example, a material of the birefringence film layer includes polyethylene terephthalate (PET) or triacetate fiber.

In the embodiment of the present disclosure, because the birefringence film layer has birefringence property, a rainbow stripe would be generated. When light passes through the anti-dazzle layer, the light would be scattered so as to eliminate the rainbow stripe. In the embodiment of the present disclosure, the rainbow stripe is eliminated on the basis that the touch functional layer still can adopt a base material layer with birefringence property, so as to reduce the cost of the touch device and also to increase the display performance of the touch device.

Figure 10:
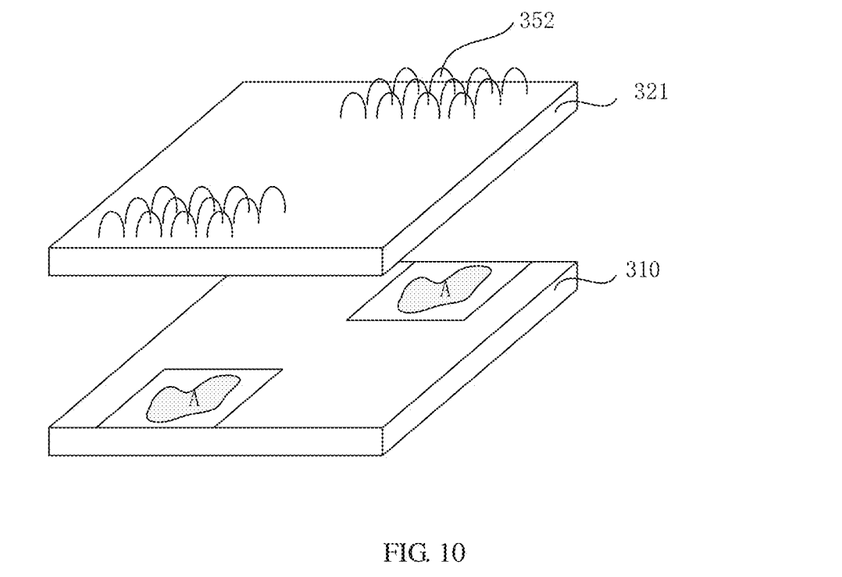
FIG. 10 is a structural diagram of yet another anti-dazzle layer provided by an embodiment of the present disclosure.

In the embodiment of the present disclosure, upon the characteristics of the rainbow stripe, an anti-dazzle structure such as the convex part may be disposed on only a designated region of the base layer of the anti-dazzle layer. For example, as illustrated in FIG. 10, the rainbow stripe A exists at only two designated positions of the touch functional layer 310, an anti-dazzle structure such as convex parts 352 are disposed in a region of the base layer 321 corresponding to the two designated positions of the rainbow stripe A, and the remaining regions of the base layer 321 still remain as a smooth surface structure with high light transmittance. In this way, the anti-dazzle region of the anti-dazzle layer just covers the position of the rainbow stripe, and the position of the display screen where no rainbow stripe is presented still keeps good imaging effect.

In the embodiment of the present disclosure, when the anti-dazzle layer is not provided, the rainbow stripe usually presents at an edge position of the display screen and is symmetrically presented. Accordingly, the position of the convex part is disposed corresponds to the position where a rainbow stripe is predicted to be presented, so as to avoid the occurrence of the rainbow stripe in the touch device. The convex part is disposed symmetrically at the edge position of the baes layer, according to the symmetrical property of the rainbow stripe.

In the embodiment of the present disclosure, the convex part 22 is disposed at the edge position of the base layer 21 corresponding to the rainbow stripe. When the convex part 22 is disposed at the edge position of the base layer 21, the remaining positions of the base layer 21 still remain as a smooth surface structure with high light transmittance, so as to ensure that the convex part 22 of the anti-dazzle layer just covers the position of the rainbow stripe, and the position of the touch device where no rainbow stripe is presented still keeps good imaging effect.

In the embodiment of the present disclosure, a material of the base layer of the anti-dazzle layer includes a material selected from a group consisting of triacetate fiber and cyclo olefin polymer.

In the embodiment of the present disclosure, a haze of the anti-dazzle layer 20 is in a range of 8%-25%; the light transmittance of the anti-dazzle layer 20 is in a range of 85%-98%.

In the embodiment of the present disclosure, the haze of the anti-dazzle layer 20 preferably is in a range of 12%-20%, and more preferably is in a range of 15%-20%; the light transmittance of the anti-dazzle layer 20 preferably is in a range of 88%-96%, and more preferably is in a range of 90%-94%.

According to the embodiment of the present disclosure, a touch display device including the touch device described in the foregoing embodiments is provided. The touch display device includes, but is not limited to, a liquid crystal touch display device, an organic light-emitting diode touch display device and the like. Further, in at least one example, the liquid crystal touch display device is an intelligent mirror.

According to the embodiment of the present disclosure, referring to FIG. 1, an intelligent mirror is provided. The intelligent mirror includes the above-described touch device. The intelligent mirror further includes a display module 40; the display module 40 is disposed at a side of the touch functional layer 10 away from the anti-dazzle layer 20. In the present embodiment, the cover plate can be used as both a mirror surface and a display screen. For example, the display module 40 is a liquid crystal display module, for example, the liquid crystal display module includes a substrate, an opposed substrate, and a liquid crystal layer disposed between the substrate and the opposed substrate. The specific structure of the liquid crystal display module can be referred to a structure of an existing liquid crystal display module, which is not repeatedly described here.

Figure 11:
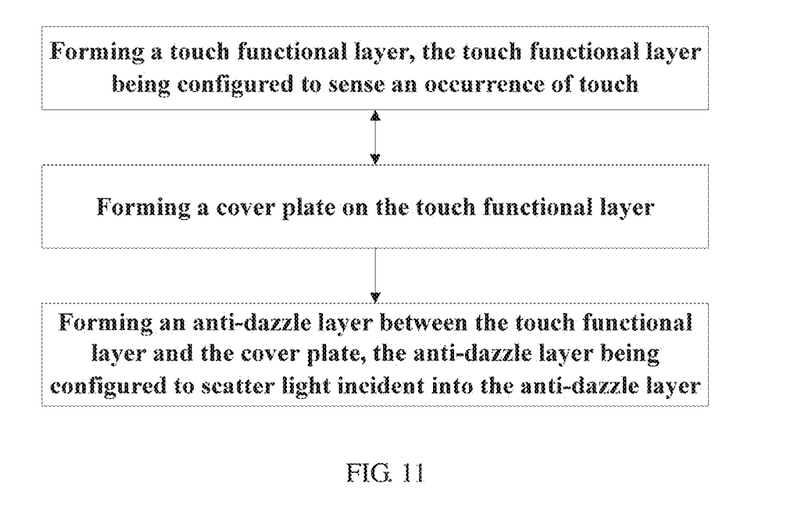
FIG. 11 is a flow chart of a manufacturing method of a touch device provided by an embodiment of the present disclosure.

According to the embodiment of the present disclosure, referring to FIG. 11, a manufacturing method of a touch device is provided, including:

forming a touch functional layer, the touch functional layer being configured to sense an occurrence of touch;

forming a cover plate on the touch functional layer; and forming an anti-dazzle layer between the touch functional layer and the cover plate, the anti-dazzle layer being configured to scatter light incident on the anti-dazzle layer.

In the above-described manufacturing method of the touch device, the anti-dazzle layer allows light emitted from the touch functional layer to be scattered, so as to eliminate the rainbow stripe formed due to the touch functional layer and to improve the display performance of the touch device.

In the present disclosure, the following statements should be noted:

(1) The accompanying drawings related to the embodiment(s) of the present disclosure involve only the structure (s) in connection with the embodiment(s) of the present disclosure, and other structure(s) can be referred to common design(s).

(2) For purpose of clarity, in the drawings describing the embodiment(s) of the present disclosure, thickness(es) of layer(s) or region(s) may be enlarged or contracted, that is, the drawings are not drafted according to actual scales.

(3) In case of no conflict, the embodiments of the present disclosure and the features in the embodiments can be combined with each other to obtain new embodiments.

What is described above is related to the illustrative embodiments of the disclosure only and not limitative to the scope of the disclosure; the scopes of the disclosure are defined by the accompanying claims.

What is claimed is:

1. A touch device, comprising:
   a touch functional layer, configured to sense an occurrence of touch;
   a cover plate, located on the touch functional layer; and
   an anti-dazzle layer, the anti-dazzle layer being disposed between the touch functional layer and the cover plate, and the anti-dazzle layer being configured to scatter light incident on the anti-dazzle layer,
   wherein a reflectivity of the cover plate is greater than a light transmittance of the cover plate, a haze of the anti-dazzle layer is in a range of 8%-25%, and a light transmittance of the anti-dazzle layer is in a range of 85%-98%.

2. The touch device according to claim 1, wherein the anti-dazzle layer comprises a base layer and a plurality of convex parts, the plurality of convex parts are at least disposed at a side of the base layer facing towards the cover plate.

3. The touch device according to claim 2, wherein the base layer comprises a first surface facing towards the cover plate and a second surface facing towards the touch functional layer, and the plurality of convex parts are disposed on only the first surface of the base layer.

4. The touch device according to claim 3, further comprising:
   a first adhesive layer, disposed between the anti-dazzle layer and the cover plate and configured to adhere the anti-dazzle layer with the cover plate; and
   a second adhesive layer, disposed between the anti-dazzle layer and the touch functional layer and configured to adhere the anti-dazzle layer with the touch functional layer.

5. The touch device according to claim 4, wherein the first surface of the base layer is provided with the plurality of convex parts, the first adhesive layer is disposed on the first surface of the base layer, and an orthographic projection of the first adhesive layer on the base layer has no overlap with orthographic projections of the plurality of convex parts on the base layer.

6. The touch device according to claim 5, wherein the second surface of the base layer is provided with the plurality of convex parts, the second adhesive layer is disposed on the second surface of the base layer, and an orthographic projection of the second adhesive layer on the base layer has no overlap with orthographic projections of the plurality of convex parts on the base layer.

7. The touch device according to claim 5, wherein the second surface of the base layer is not provided with the convex part, and the second adhesive layer is disposed on an entirety of the second surface of the base layer.

8. The touch device according to claim 2, wherein the base layer comprises a first surface facing towards the cover plate and a second surface facing towards the touch functional layer, and the plurality of convex parts are disposed on the first surface and the second surface of the base layer.

9. The touch device according to claim 2, wherein the plurality of convex parts are located at a position of the base layer where corresponds to a position of the touch functional layer where a rainbow stripe is to be presented.

10. The touch device according to claim 2, wherein the convex part is of a core-shell structure, and a refractive index of a material of the core-shell structure is gradually increased from the core to the shell.

11. The touch device according to claim 10, wherein the convex part comprises: a first material layer, a second material layer enveloping the first material layer, and a third material layer enveloping the second material layer, and the first material layer is closer to the base layer than both the second material layer and the third material layer to the base layer.

12. The touch device according to claim 11, wherein a refractive index of the first material layer is in a range of 1.15-1.45, a refractive index of the second material layer is in a range of 1.25-1.55, and a refractive index of the third material layer is in a range of 1.35-1.65.

13. The touch device according to claim 1, wherein the touch functional layer comprises a base material layer, and the base material layer comprises a material with birefringence effect.

14. The touch device according to claim 1, wherein a material of the convex part is selected from a group consisting of silicon oxide, titanium dioxide, cerium fluoride, sodium hexafluoro aluminate, aluminium sesquioxide, hafnium oxide, calcium fluoride, magnesium fluoride, magnesium oxide, zirconium oxide, praseodymium fluoride, scandium oxide, lanthanum fluoride, barium fluoride, and yttrium fluoride.

15. The touch device according to claim 1, wherein a material of the base layer is selected from a group consisting of triacetate fiber and cyclo olefin polymer.

16. An intelligent mirror, comprising:
   a touch device, comprising:
      a touch functional layer, configured to sense an occurrence of touch;
      a cover plate, located on the touch functional layer; and
      an anti-dazzle layer, the anti-dazzle layer being disposed between the touch functional layer and the cover plate, and the anti-dazzle layer being configured to scatter light incident on the anti-dazzle layer;
   a display module, the display module being disposed at a side of the touch functional layer away from the anti-dazzle layer,
   wherein a reflectivity of the cover plate is greater than a light transmittance of the cover plate, a haze of the anti-dazzle layer is in a range of 8%-25%, and a light transmittance of the anti-dazzle layer is in a range of 85%-98%.

17. A manufacturing method of a touch device, comprising:
   forming a touch functional layer, the touch functional layer being configured to sense an occurrence of touch;
   forming a cover plate on the touch functional layer; and forming an anti-dazzle layer between the touch functional layer and the cover plate, the anti-dazzle layer being configured to scatter light incident on the anti-dazzle layer, wherein a reflectivity of the cover plate is greater than a light transmittance of the cover plate, a haze of the anti-dazzle layer is in a range of 8%-25%, and a light transmittance of the anti-dazzle layer is in a range of 85%-98%.

* * * * *